(12) United States Patent
Cavalcanti et al.

(10) Patent No.: US 11,395,352 B2
(45) Date of Patent: Jul. 19, 2022

(54) DISCOVERY AND ESTABLISHMENT OF COMMUNICATION GROUPS FOR WIRELESS VEHICULAR COMMUNICATIONS

(71) Applicant: Intel Corporation, Santa Clara, CA (US)

(72) Inventors: Dave Cavalcanti, Portland, OR (US); Ana Lucia Pinheiro, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 268 days.

(21) Appl. No.: 15/574,012

(22) PCT Filed: Dec. 22, 2015

(86) PCT No.: PCT/US2015/067341
§ 371 (c)(1),
(2) Date: Nov. 14, 2017

(87) PCT Pub. No.: WO2016/209314
PCT Pub. Date: Dec. 29, 2016

(65) Prior Publication Data
US 2018/0295655 A1    Oct. 11, 2018

Related U.S. Application Data

(60) Provisional application No. 62/184,707, filed on Jun. 25, 2015.

(51) Int. Cl.
*H04W 76/10*    (2018.01)
*H04W 4/40*    (2018.01)
(Continued)

(52) U.S. Cl.
CPC .............. *H04W 76/10* (2018.02); *H04W 4/40* (2018.02); *H04W 4/46* (2018.02); *H04W 12/35* (2021.01);
(Continued)

(58) Field of Classification Search
CPC .......... H04W 76/10; H04W 4/40; H04W 4/80
See application file for complete search history.

(56) References Cited

U.S. PATENT DOCUMENTS

| 9,648,653 B2 | 5/2017 | Kim et al. |
| 9,706,340 B2 | 7/2017 | Kim et al. |

(Continued)

FOREIGN PATENT DOCUMENTS

| JP | 2010-268085 | 11/2010 |
| KR | 101431340 B1 | 8/2014 |

(Continued)

OTHER PUBLICATIONS

International Preliminary Report on Patentability and the Written Opinion of the International Searching Authority for International Application No. PCT/US2015/067341, dated Jan. 4, 2018, 10 pages.

(Continued)

*Primary Examiner* — Sai Aung
*Assistant Examiner* — Liem H. Nguyen
(74) *Attorney, Agent, or Firm* — Alliance IP, LLC

(57) ABSTRACT

The discovery and establishment of communication groups is described for wireless vehicular communications. Some embodiments include receiving a registration request from a user equipment (UE) in a vehicular environment to provide services over a wireless access in vehicular environments (WAVE) basic service set (WBSS) in wireless channels 5 at a vehicular proximity services (ProSe) function, deciding at the ProSe function to authorize registration of the UE to provide services over the WBSS, and sending a registration
(Continued)

```
RECEIVE A WIBSS REGISTRATION REQUEST MESSAGE FROM A UE    ~812
                            |
                            v
AUTHORIZE WBSS SERVICES FOR THE UE                        ~814
                            |
                            v
PROVIDE A WBSS REGISTRATION RESPONSE MESSAGE TO THE UE    ~816
``` response from the ProSe function confirming WBSS information to be used for the services after deciding to authorize the UE.

19 Claims, 6 Drawing Sheets

(51) Int. Cl.
    *H04W 4/46* (2018.01)
    *H04W 12/30* (2021.01)
    *H04W 4/08* (2009.01)
    *H04W 4/80* (2018.01)
    *H04W 8/18* (2009.01)
    *H04W 8/24* (2009.01)
    *H04W 12/06* (2021.01)
    *H04W 60/04* (2009.01)
    *H04W 76/14* (2018.01)
    *H04W 84/12* (2009.01)

(52) U.S. Cl.
    CPC ............ *H04W 4/08* (2013.01); *H04W 4/80* (2018.02); *H04W 8/18* (2013.01); *H04W 8/24* (2013.01); *H04W 12/06* (2013.01); *H04W 60/04* (2013.01); *H04W 76/14* (2018.02); *H04W 84/12* (2013.01)

(56) References Cited

U.S. PATENT DOCUMENTS

| | | | | |
|---|---|---|---|---|
| 2014/0035526 | A1* | 2/2014 | Tripathi | B60L 53/36 320/109 |
| 2014/0195102 | A1* | 7/2014 | Nathanson | H04W 4/48 701/31.4 |
| 2014/0341132 | A1* | 11/2014 | Kim | H04W 8/005 370/329 |
| 2014/0342735 | A1 | 11/2014 | Liao | |
| 2015/0063260 | A1* | 3/2015 | Kuo | H04W 8/005 370/329 |
| 2015/0312883 | A1* | 10/2015 | Han | H04W 76/40 370/328 |
| 2015/0360611 | A1* | 12/2015 | Cherkaoui | B60Q 9/008 340/436 |
| 2016/0169688 | A1* | 6/2016 | Kweon | G08G 1/087 701/522 |
| 2016/0198329 | A1* | 7/2016 | Lee | H04W 8/005 455/434 |
| 2016/0374104 | A1* | 12/2016 | Watfa | H04W 36/0011 |
| 2017/0202038 | A1* | 7/2017 | Ahmad | H04W 4/80 |
| 2018/0077668 | A1* | 3/2018 | Chun | H04W 4/00 |
| 2018/0103490 | A1* | 4/2018 | Li | H04W 88/02 |
| 2018/0192268 | A1* | 7/2018 | Xu | G08G 1/00 |
| 2018/0234990 | A1* | 8/2018 | Watfa | H04W 72/10 |

FOREIGN PATENT DOCUMENTS

| | | |
|---|---|---|
| WO | WO 2013/095001 | 6/2013 |
| WO | WO 2013/122374 | 8/2013 |
| WO | 2014071140 A2 | 5/2014 |
| WO | WO 2014/071140 | 5/2014 |
| WO | 2015003153 A1 | 1/2015 |

OTHER PUBLICATIONS

PCT International Search Report and Written Opinion of the International Searching Authority for International Application No. PCT/US2015/067341, dated Apr. 12, 2016, 11 pages.
3GPP TR 23.703 V12.0.0, '3GPP; TSG-SA; Study on architecture enhancements to support Proximity-based Services (ProSe) (Release12)', Mar. 10, 2014, pp. 1-2 and 45-46.
Supplementary European Search Report and Written Opinion received for EP Patent Application No. 15896592.1, dated Oct. 8, 2018, 8 pages.
Deutschmann, G., "Autotelefon Mit Tei Lnehmerwahl", Technische Mitteilungen Aeg-Telefunken, vol. 63, No. 2, 1973, pp. 49-51.
3GPP, "Proximity-based services (ProSe)", Stage 2, Release 13, 3rd Generation Partnership Project, 3GPP Draft, 23303-D00, Jun. 22, 2015, pp. 1-97.
"Wireless LAN Medium Access Control (MAC) and Physical Layer (PHY) Specifications Amendment 6: Wireless Access in Vehicular Environments", IEEE Std 802.11p-2010, Institute of Electrical and Electronics Engineers (IEEE) Standard, Jul. 15, 2010.
Japanese Office Action for Application No. 2017-553215, dated Aug. 27, 2019, 7 pages.
TR 23.703 version 2.0.0: 'Study on architecture enhancements to support Proximity-based Services (ProSe) (Release 12)' for Approval, 3GPP TSG SA Meeting #63, Fukuoka, Japan, Mar. 5-7, 2014, 20 pages.
Lee Armstrong, IEEE P802.11 Wireless LANs, May 15, 2007, 8 pages.
Broady Cash et al., 5.9 GHz Wireless Access in Vehicular Environments/ Dedicated Short Range Communication (5.9 Wave/DSRC), Jul. 2004, 21 pages.
Notice of Reasons for Refusal for Application No. 2017-553215, dated Aug. 8, 2019, 7 pages.
IEEE Standards Association, IEEE Guide for Wireless Access in Vehicular Environments (WAVE) Architecture, IEEE Std 1609.0, 2013.
3GPP TR 22.885 v0.2.0, 3rd Generation Partnership Project; Technical Specification Group Services and System Aspects; Study on LTE Support for V2X Services (Release 14), Apr. 2015.
Examination Report for EP Application No. 15896592.1 dated Jul. 26, 2019.
European Communication for Application No. 15 896 592.1-1218 dated Jul. 26, 2019, 4 pages.
3GPP TSG-SA WG1 Meeting #68, S1-144374, "V2X Communication in 3GPP," Qualcomm Incorporated; Nov. 2014; San Francisco, USA; 7 pages.
3GPP TSG-SA WG1 Meeting #70, S1-151127, "Discussion on requirements of V2V safety applications," CATT; Apr. 2015; San Jose Del Cabo, Mexico; 5 pages.
SIPO; First Office Action issued in Chinese Patent Application No. CN 201580080170.8, dated Aug. 5, 2020; 17 pages including English translation.

* cited by examiner

DISCOVERY AND ESTABLISHMENT OF COMMUNICATION GROUPS FOR WIRELESS VEHICULAR COMMUNICATIONS

CROSS-REFERENCE TO RELATED APPLICATIONS

This patent application is U.S. National Phase Application under 35 U.S.C. § 371 of International Application No, PCT/US2015/067341, filed Dec. 22, 2015, entitled DISCOVERY AND ESTABLISHMENT OF COMMUNICATION GROUPS FOR WIRELESS VEHICULAR COMMUNICATIONS, which claims priority to U.S. Provisional Application No. 62/184,707, filed Jun. 25, 2015, entitled NETWORK ASSISTED V2X WBSS DISCOVERY.

FIELD

The present description is related to wireless communications and in particular to establishing communication groups for wireless vehicle communications.

BACKGROUND

Intelligent Transportation Systems (ITS) endeavor to improve safety and efficiency on roadways by adding intelligence to moving vehicles and also to fixtures on and around roadways. There are many different functions and purposes that could be enabled by ITS. Some of these include managing traffic flow and lane occupancy, collecting tolls, tracking freight, providing road condition alerts, alerting about pedestrians and other obstacles on the roadway, and the like. In addition to intelligent vehicles and fixtures, ITS seeks to allow vehicles to communicate with other vehicles and with other proximate devices on or near the roadway.

The Wireless Access in Vehicular Environments (WAVE) architecture and standards have been developed to support ITS safety and non-safety applications. Most ITS applications rely on the concept of situational awareness by the vehicles and the fixtures that is then enhanced by a co-operative awareness. The co-operative awareness is based on periodic and event-driven broadcast of basic safety messages (BSM) between vehicles (i.e., vehicle to vehicle (V2V) communication), between vehicles and infrastructure fixtures (i.e., vehicle to infrastructure (V2I) communications), and between vehicles and pedestrians (i.e., vehicle to pedestrian (V2P) communications). Collectively, V2V, V2I, and V2P communications are designated as vehicle to everything (V2X) communications.

Basic Safety Messages (BSM) are defined in the SAE J2735 Standard for Dedicated Short Range Communications (DSRC) Message Set Dictionary in the US. Co-operative Awareness Messages (CAM) and Decentralized Environmental Notification Messages (DENM) are similar messages that are defined in EU standards.

In several ITS scenarios, Road Side Units (RSUs) are defined as communication nodes that are able to provide safety services (e.g. interaction collision warning) and non-safety (mobility information) services to vehicles and to other RSUs through broadcast messages.

V2X communications are provided in part by a dedicated short range communications (DSRC) channel, which may be carried by a local and metropolitan area network such as defined in the IEEE 802.11p standard and by a cellular network (e.g., long term evolution (LTE), fifth generation (5G), etc.). The 802.11p standard may use channels of 10 MHz bandwidth in the 5.9 GHz band (5.850-5.925 GHz). The DSRC may be one or more one-way or two-way short-range or medium-range wireless communication channels that are specifically designed for automotive vehicles. V2X devices may be equipped with multiple radios operating in different spectrum bands. Cellular networks may be used to assist V2X devices to discover and take advantage of safety and non-safety services, which may be broadcasted over one or more DSRC channels.

In order to send and receive messages in a DSRC 802.11p or cellular channel, a device (e.g. RSU or vehicle) set ups or discovers and is joined to a WAVE basic service set (WBSS), which is a basic service set (BSS) where devices may operate in the WAVE mode and may communicate without the need to execute the typical 802.11 authentication and association procedures. In order to discover a given WBSS, V2X devices scan multiple DSRC channels for messages from that WBSS. The WBSS will be identified by a BSSID (Base Station Subsystem Identification) in the 802.11 MAC (Media Access Control) layer frames.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Basic Safety Messages (BSM) are relatively short messages that may be used to transmit information locally that identifies situations that may require fast action. These messages may include collision warnings, emergency stops, pre-crash warnings, etc. For these types of messages, action may be required within time intervals of a few to a few hundred milliseconds (e.g. 20 to 100 msec). As described herein BSM transmission may be set up very quickly. The overhead messaging is reduced to provide scalable transmission and reception of BSMs for V2X.

New procedures are described herein for enabling LTE (Long Term Evolution) EPC (Enhanced Packet Core) support for faster V2X WLAN (Wireless Local Area Network) discovery and communication over DSRC/802.11p channels for V2X UEs. The LTE EPC assisted WLAN discovery functionality may be used for discovery and communication of V2X Services over DSRC/802.11p networks. This includes a WBSS services registration procedure to register UEs for V2X communications and ProSe Function support for announcements to all registered UEs.

The WLAN discovery functionality may use announce messages sent from the WBSS to any UEs in the area. The announce messages may be broadcast, multi-cast or unicast. In some embodiments, the announce messages may be proactively sent periodically for specific locations, for instance, near intersections. In other embodiments, the timing may be adjusted based on expected or current traffic patterns and hours of the day. The timing and nature of the announce messages, may be determined by the network.

Figure 1:
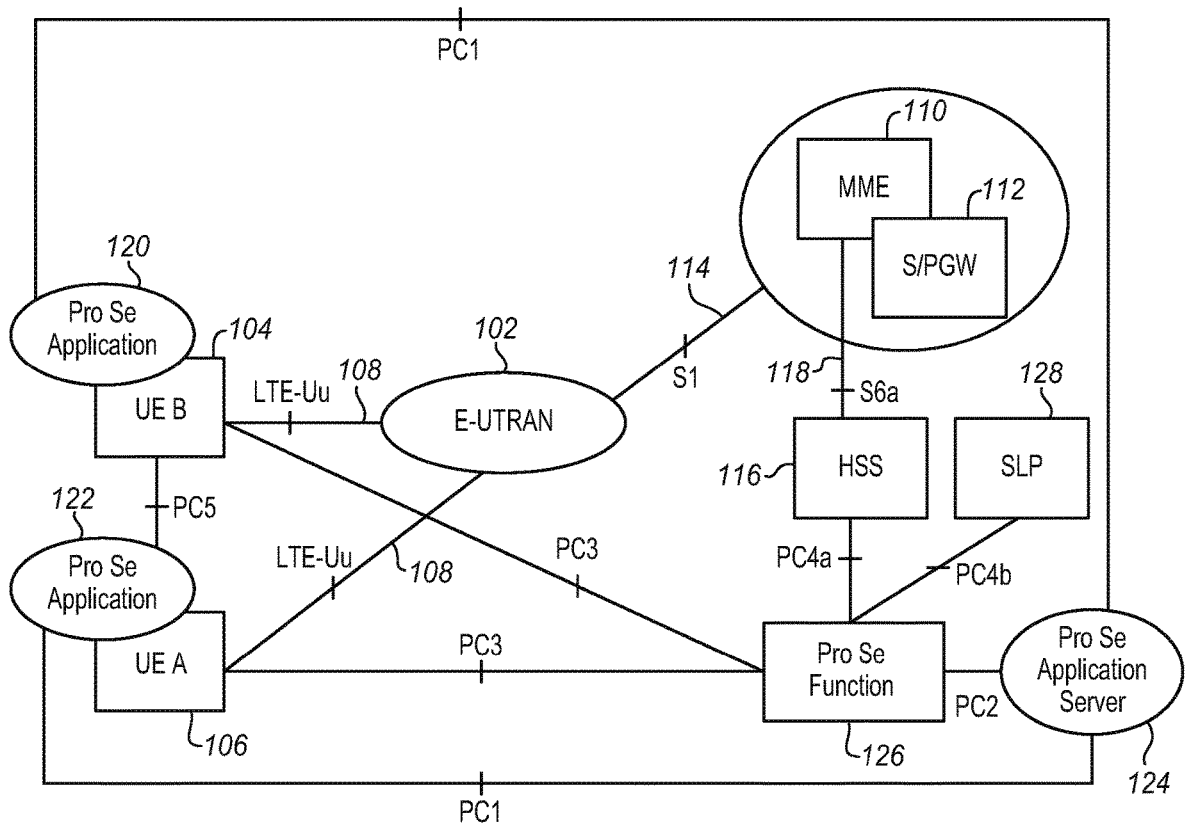
FIG. 1 is a block diagram of a portion of an LTE network in a vehicular environment with proximity services (ProSe) according to an embodiment.

FIG. 1 is a diagram of a portion of an LTE network with proximity services (ProSe). The network includes an evolved universal terrestrial radio access network (E-UTRAN) 102 coupled to a first user equipment (UE), UE A 106 and a second UE, UE B 104 through an LTE air interface physical layer Uu link 108. The UEs are also able to communicate directly with each other through a PC5, WLAN (Wireless Local Area Network), Wi-Fi, or other communications link. The E-UTRAN 102 connects to a mobility management entity (MME) 110 and to a serving gateway (SGW) or packet data network (PDN) gateway (PGW) 112 through an S1 physical layer interface 114. The MME or S/PGW connects to a home subscriber server (HSS) 116 through a PC4, S6, or other physical data layer link 118.

The proximity services use a ProSe application 120, 122 at each participating UE coupled to one or more ProSe application servers 124 through a PC1 or similar link. A ProSe a plication server 124 is coupled to a ProSe function 126 via a PC2 link. The ProSe application server delivers ProSe functions 126 to the UEs 104, 106 through a PC3 or similar link. The ProSe application servers also deliver ProSe functions to the HSS 116 and a SUPL (Secure User Plane Location) location platform (SLP) 128 through PC4 or similar links which delivers location awareness to the UEs and to any other mobile nodes in the system. The ProSe function may also connect with other services and systems as desired to perform the described and other functions.

The LTE ProSe specification introduced new functionalities and interfaces as shown. ProSe (also referred to as direct device-to-device (D2D) communications) may allow a first user equipment (UE) to detect the presence of a second UE that is proximate to the first UE, establish a direct connection or communication session, and communicate with the second UE over the direct connection. A UE, mobile terminal, mobile communication device, etc., that is enabled for V2X communications may be referred to as a "V2X device", a "V2X UE", and the like. One of the new functionalities of the LTE ProSe specification is the EPC (Enhanced Packet Core) support for WLAN direct discovery and communication. This functionality allows the EPC network to enable two or more ProSe-enabled WLAN-capable UEs to directly communicate using WLAN technology. This decision can be taken, for example, when the EPC network supports EPC-level ProSe discovery and becomes aware that two or more UEs are in close proximity and when the EPC network knows that a first UE (UE-A) requests to communicate with a second UE (UE-B).

Figure 2:
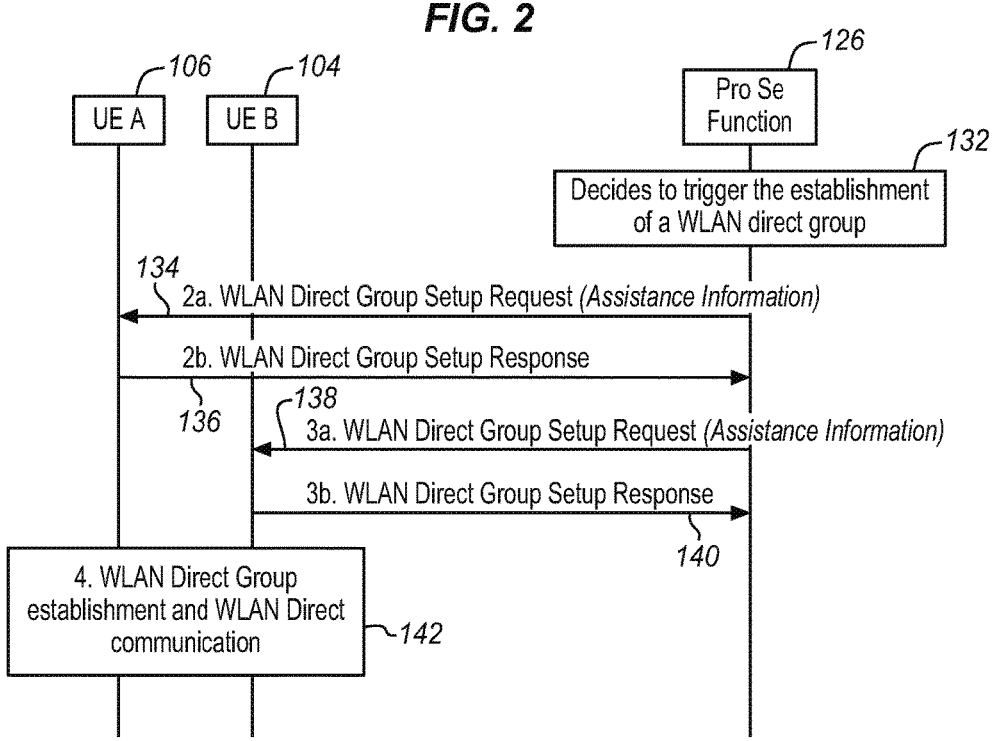
FIG. 2 is a signaling diagram for enabling two UEs to communicate over WLAN.

FIG. 2 is a signaling diagram that shows a procedure to enable two target devices (UE-A and UE-B), which are determined to be in close proximity by the ProSe function to communicate directly over a WLAN or PC5 channel, such as an 802.11p channel. The ProSe function provides WLAN direct group configuration information (Assisted Information), which may include a basic service set identifier (BSSID), wireless local area network (WLAN) security key, one or more group addresses, an operating channel, and/or a validity time.

The ProSe function 126 first decides 132 to trigger the establishment of a WLAN direct group. The decision may be triggered by a request from a UE to communicate with another UE. The decision may be from the network or from any other source for any appropriate reason.

In this example, the group has two UEs, however, there may be many more nodes in the group including additional vehicles, pedestrians, and RSUs. The ProSe function sends a WLAN Direct Group Setup Request 134, 138 to each of the possible members of the group, in this case the two UEs 104, 106. This setup request includes much of the information that will be used to set up the group, such as identifiers, keys, addresses, and wireless parameters. In response to this request, each participating group member sends a WLAN Direct Group Setup Response 136, 140. The UEs then proceed to establish the group and the direct communication 142. After these messages, the UEs are able to manage traffic flow and lane occupancy, send tolls, and tracking information as well as provide road condition alerts, pedestrian alerts and other speed, traffic, weather and other types of information. The UEs are able to communicate much more than BSMs, such as information about local attractions, and events and even provide communication between drivers and passengers.

Consider an intelligent transportation systems (ITS) scenario in which an RSU provides V2X services over DSRC/802.11p. As an example, the RSU may periodically broadcast safety messages, such as BSMs using a specific BSSID in one of the DSRC/802.11p service channels. According to the process shown in FIG. 2, the ProSe function first directs each V2X device in the area, such as the UE's shown, to join the RSU's WBSS, by sending a WLAN Direct Set up Request. The ProSe function then waits for a corresponding response from each V2X and other UE.

When there are a large number of devices, and when some devices are moving at high speeds, the current WLAN direct discovery and communication procedure as shown in FIG. 2 may not be efficient enough or fast enough to warn of dangers in time. There is a latency in the signaling scenario and it may be too great for the message to be useful in some urgent V2X scenarios. In some cases, a UE may desire to access RSU services within a small area or within a short time window.

Figure 3:
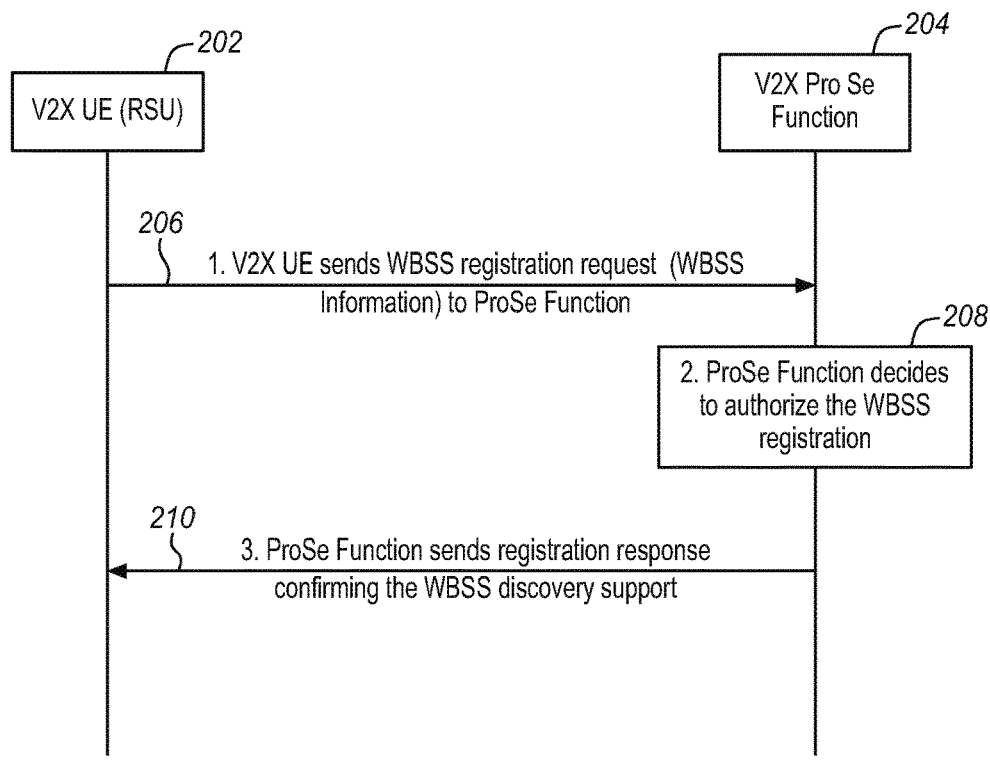
FIG. 3 is a signaling flow diagram for WBSS discovery in a vehicular environment according to an embodiment.

Example embodiments provide new procedures for enabling EPC support for V2X WLAN discovery and communication over DSRC/802.11p channels for V2X UEs. Example embodiments provide enhancements to the LTE ProSe function to enable network assisted discovery of WBSSs operating over DSRC/802.11p channels. Various example embodiments include a V2X WBSS services registration procedure and a V2X ProSe Function support for WBSS announcements. Example embodiments, allow the LTE EPC assisted WLAN discovery functionality to be used for discovery and communication of V2X Services over DSRC/802.11p networks FIG. 3 is a signaling flow diagram for two entities in a mobile network such as a V2X UE 202 and a V2X ProSe function 204. The V2X UE may be an RSU or another suitable entity. As used in this diagram, a V2X UE is a UE that supports ProSe and V2X enabling features, as described herein. A V2X ProSe Function is a V2X specific functionality that may be part of the ProSe function or that is a standalone function.

The signaling diagram shows a particular example for WBSS service provider registration. According to various embodiments, in order to enable network assistance, a V2X UE that provides services over a WBSS in DSRC/802.11p channels sends 206 a registration request to a V2X ProSe function carrying WBSS Information.

The WBSS information may include:

A service set identifier (SSID): BSSID as defined in 802.11p.

Operating channel: DSRC channel number, which may be a control channel (CCH) or service channel (SCH);

Security information: V2X UEs authentication information as defined in IEEE 1609.2.

List of service identifiers: One of more service ids, such as the PSID (Provider Service Identifier) in the IEEE WAVE standards, which uniquely defines application-services provided by a higher layer entity.

Such a registration request identifies the UE to the ProSe function and indicates that the UE is ready to receive and transmit announcements such as BSM and other WAVE services. The rich information provided in the request allows the response to be quickly answered without providing a significant amount of additional information. On the other hand, the ProSe may provide all new information in its response.

In response to and after receiving the WBSS registration request 206, the V2X ProSe function may decide 208 whether to authorize the registration of the WBSS service. The ProSe function may authenticate the V2X UE's credentials with a serving network of the V2X UE and any other internal or external ITS servers. This response provides authorization and information for the UE to receive and transmit announcements and other WAVE services from RSUs and other members of the WLAN group.

If the ProSe function decides to authorize the UE, then the V2X ProSe function sends 210 a registration response identifying the WBSS Information to be used by the UE to communicate on the network. The V2X ProSe function may use the same WBSS information in the received request 206. Alternatively, the V2X ProSe function may use the WBSS information in the registration response to change any one or more of the WBSS configuration parameters, such as security keys and the operating channel. The WBSS service registration procedure may be executed as part of an initial V2X UE authorization or registration with the V2X ProSe function. Alternatively, it may be executed at any time before the UE starts providing V2X application services. The same or a similar procedure may also be used by the UEs to update their WBSS configuration.

In order to use V2X ProSe function assistance for WBSS discovery and communications, the V2X UEs that wish to receive V2X services offered by a WBSS may transmit 206 their WBSS/DSRC capabilities to the V2X ProSe Function during initial registration or when a new capability is enabled or otherwise acquired by the UE. The UEs may also provide a list of subscribed WBSS services (e.g. PSID list) as part of the registration process.

Once the WBSS service providing UEs (e.g. UEs implementing RSU functionality) and consuming UEs (e.g. vehicle and pedestrian UEs) are identified, the V2X ProSe function may use a combination of location, service subscription and geo-casting information to decide where and when to announce WBSS availability by sending a WBSS announcement.

Figure 4:
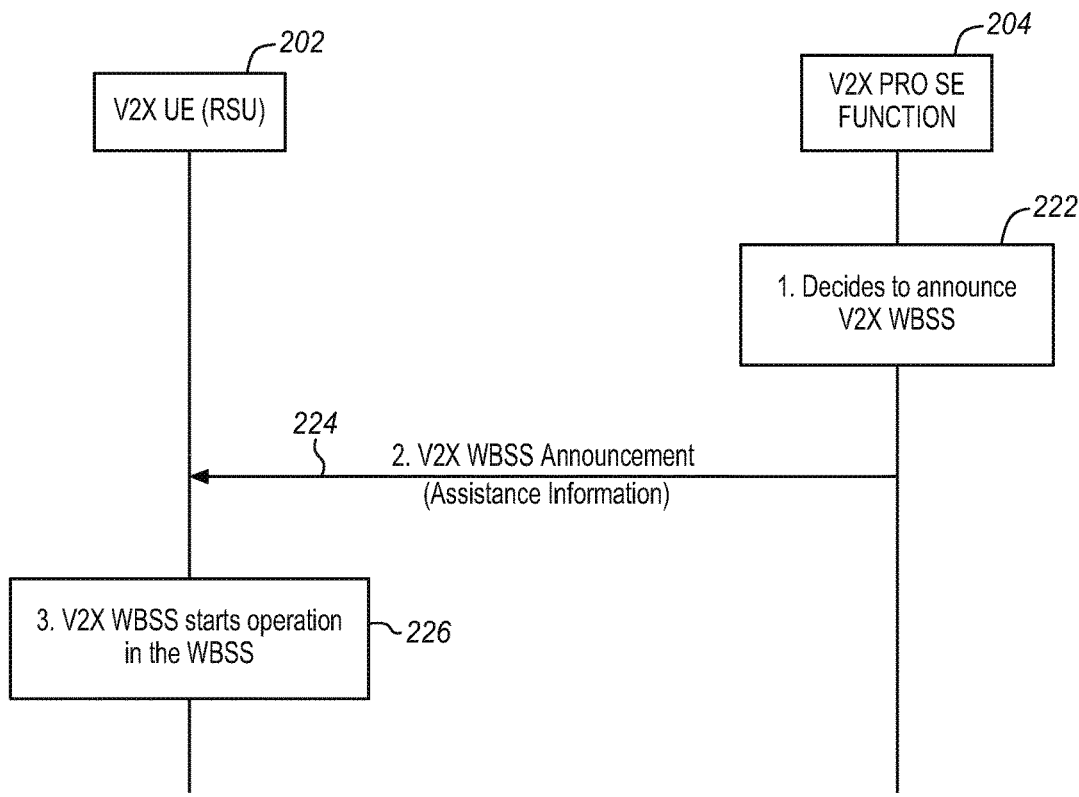
FIG. 4 is a signaling flow diagram for EPC support of WBSS discover and communication according to an embodiment.

FIG. 4 is a signaling flow diagram for EPC support for WBSS discovery and communication. A V2X ProSe function 204 decides 222 to announce a V2X WBSS to one or more V2X UEs. This may be based on new network changes, pending information or any other factor. The V2X ProSe function then sends the V2X WBSS Announcement (Assistance Information) 224.

Once a WBSS announcement 224 is received from the V2X ProSe Function 204, the V2X UEs start 226 operation in the announced WBSS using the Assistance Information received. The UE is now able to receive announcement and other services from other UEs, from RSUs and from any other nodes in the WLAN group. The WBSS announcement 224 may be transmitted as a broadcast and include a list of the services provided by the WBSS. This allows the V2X UEs that are subscribed to the service to join the WBSS right away, without sending a response back to the V2X ProSe Function. This reduces the overall latency in the process of joining a WBSS. In the described signal flow, the V2X ProSe function is authorized to control the operation of the V2X UEs in DSRC channels. Alternatively, the ProSe function may be commanded from a higher level for the functions that it is allowed to control.

Figure 5:
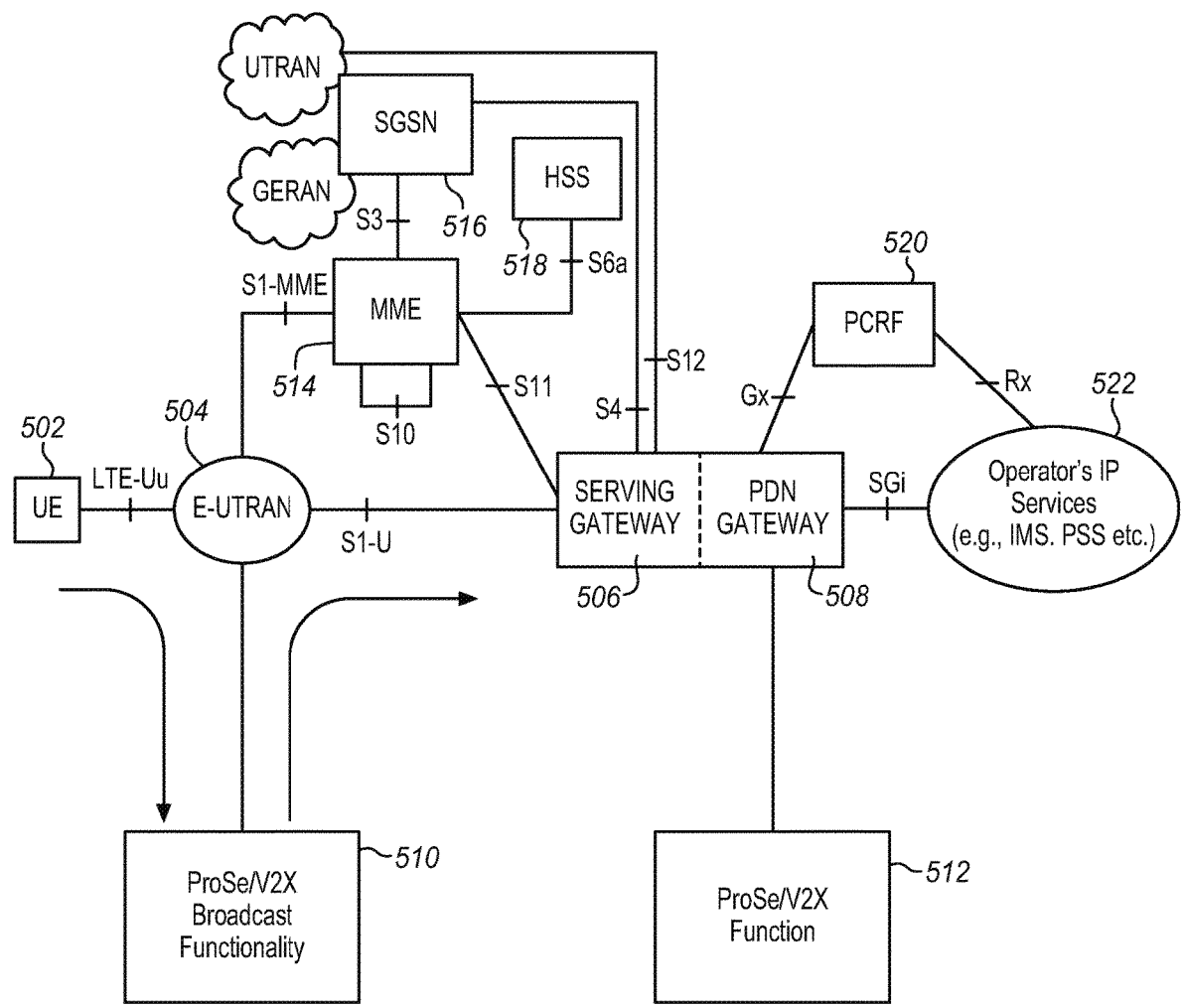
FIG. 5 is a block diagram of portion of an alternative LTE network in which some or all of the ProSe functionality is integrated into an E-UTRAN eNB according to an embodiment.

As shown in FIG. 5 in another embodiment, the support for WBSS discovery and communication may be provided by a V2X ProSe broadcast functionality in an eNB, such as the E-UTRAN of FIG. 1 or any other eNB with which the UE is connected. This may reduce the communication overhead between UEs and the ProSe function over the Core Network (CN).

FIG. 5 shows core network in which a UE 502 in a vehicular environment is coupled through an LTE-Uu or other wireless protocol to an E-UTRAN 504 serving as an eNB for the UE. The E-UTRAN is coupled through S1-U or another type of link to a serving gateway 506 and a connected or integrated PDN gateway 508. The PDN gateway is coupled to a ProSe Function 512 and through SGi or a similar link to the operator's IP (Internet Protocol) services 522, for example IMS, PSS, etc. A policy and charging rules function (PCRF) 520 may be linked to the PDN gateway with a Gx connection and to the Operator's IP services with a Rx function and to other components of the core network as desired. The E-UTRAN is also coupled to or contains ProSe/V2X broadcast functionality 510 that is coupled through the PDN gateway to the ProSe Function 512.

The E-UTRAN is further coupled to an MME through S1-MME which may also be coupled to the serving gateway through S11. The MME provides connections to a variety of different functions and systems that may be integrated into the MME or provided separately. These may include a home subscriber server (HSS) 518, a serving GPRS (general packet radio service) support node (SGSN) 516 as well as UTRAN and GSM (Global System for Mobile communications) EDGE (Enhanced Data Rated for GSM Evolution) radio access network (GERAN) and any other desired services.

In this case, the WBSS registration procedure may be carried out between V2X UEs 502 and the eNB 504. The eNB may communicate with the V2X ProSe Function 512 in the CN in order to confirm the UE's authorization. In order to further reduce communication overhead, the ProSe/V2X broadcast functionality 510 eNB 504 may be made responsible for deciding when to transmit the WBSS announcements. Accordingly, the V2X functionality of the ProSe function, or parts of it, may be implemented locally at the eNB.

The impact on core network (CN) procedures may be minimized to enhance functionality and speed without disrupting other operations. The V2X UE may include the WBSS/DSRC capability indication as part of the "UE Network Capability" in the Attach Request and/or Tracking Area Update Request message. The MME may store this information for ProSe/V2X operation. The WBSS/DSRC capability can indicate whether the UE is capable of supporting WLAN direct services.

The V2X UE may be authorised to provide WBSS/DSRC direct services based on the subscription data. The MME may include a "WBSS/DSRC authorised" indication in the S1 AP Initial Context Setup Request, also indicating whether the UE is capable of supporting WLAN direct services.

Figure 6:
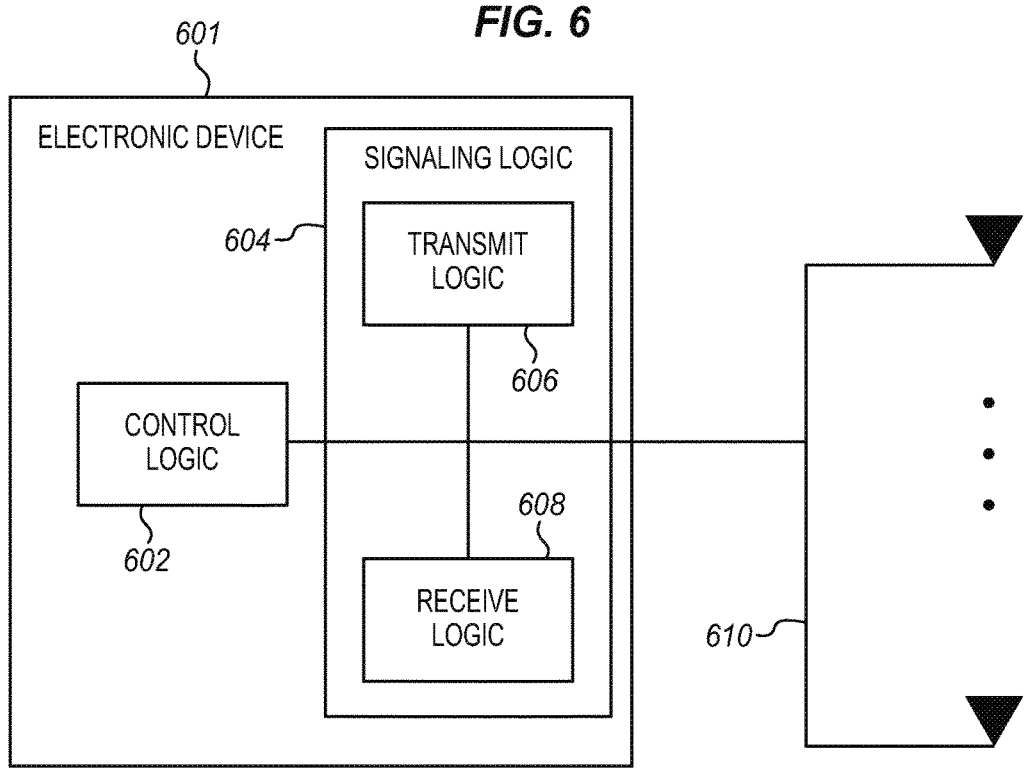
FIG. 6 is a block diagram of a core network device according to an embodiment.

FIG. 6 is a block diagram that illustrates an electronic device 601 that may be, or may be incorporated into or otherwise part of, an eNB, a MME, and/or any other type of network element or other like electronic device in accordance with various embodiments. Specifically, the electronic device may be logic and/or circuitry that may be at least partially implemented in one or more of hardware, software, and/or firmware.

In embodiments, the electronic device logic may include signaling logic 604, which may include radio transmit logic 606 and receive logic 608 coupled to control logic 602. In embodiments, the transmit and/or receive logic may be elements or modules of transceiver logic, as shown 604. The electronic device may be coupled with or include one or more plurality of antenna elements of one or more antennas 610.

The electronic device and/or the components of the electronic device may be configured to perform operations similar to those described elsewhere in this disclosure. For example, in embodiments where the electronic device is implemented in an eNB or a core network (CN) element, the control logic may authorize registration of a WBSS service for a user UE. To authorize registration of the WBSS service for the UE, the control logic may authenticate credentials associated with the UE with a serving network of the UE and/or one or more external ITS servers. In such embodiments, the signaling logic may provide a registration response to the UE. The registration response may include an indication as to whether the UE has been authorized for the WBSS services.

In embodiments where the electronic device is implemented in an eNB, the signaling logic may receive a registration request message from a UE over a LTE-Uu interface. Further, in embodiments where the electronic device is implemented in an eNB, the control logic may include a ProSe authorised indication or a V2X authorized indication in an X2-application protocol (AP) Handover Request message during X2-based handover procedure. The ProSe authorized indication may indicate that the UE is authorized to use ProSe and the V2X authorized indication may indicate that the UE is authorized to use WBSS services and/or wireless local area network (WLAN) direct services.

In embodiments where the electronic device is implemented in a CN element, the CN element may be communicatively coupled via an interface with a serving gateway (SGW) or a packet data network (PDN) gateway (PGW). Furthermore, when the electronic device is implemented in an MME, the signaling logic may receive a message including a capability indication. In such embodiments, the control logic may store the capability indication, and provide the capability information to authorize capabilities indicated by the capability information.

Figure 7:
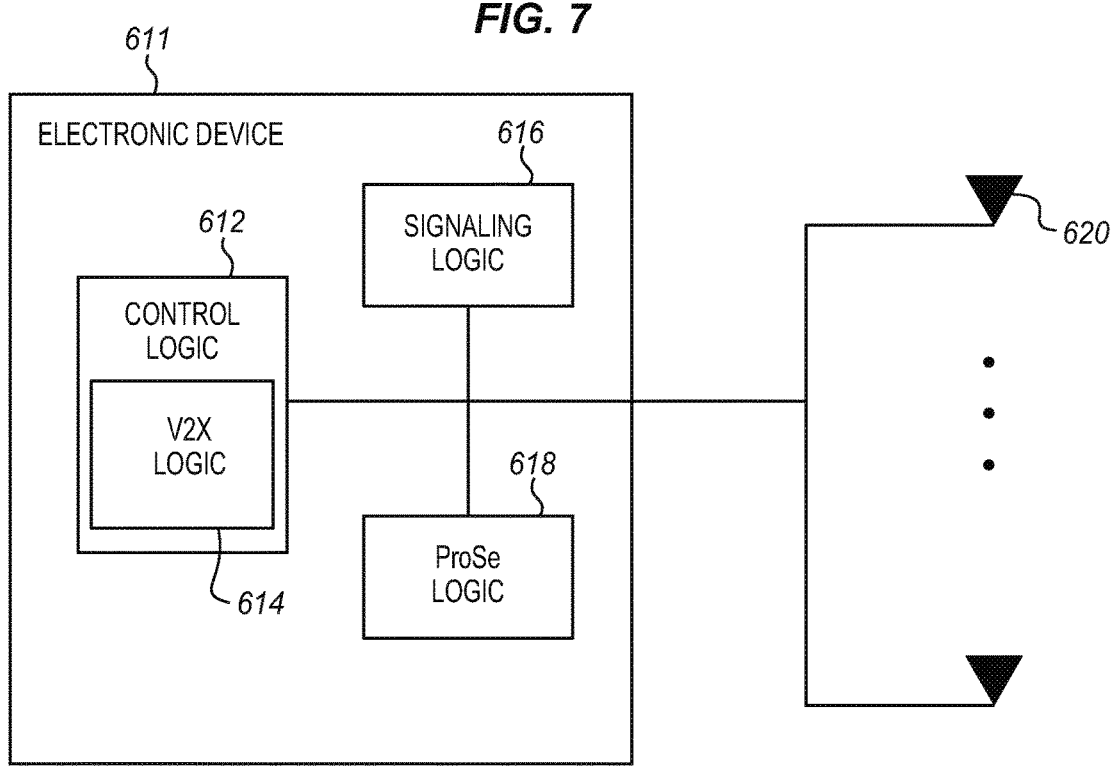
FIG. 7 is a block diagram of a UE or mobile device according to an embodiment.

FIG. 7 is a block diagram that illustrates an electronic device 611 that may be, or may be incorporated into or otherwise part of, a UE, a mobile device, and/or any other type of electronic device in accordance with various embodiments. Specifically, the electronic device may be logic and/or circuitry that may be at least partially implemented in one or more of hardware, software, and/or firmware. In embodiments, the electronic device logic may include signaling logic 616, which may include radio transmit logic and receive logic (not shown); coupled with ProSe logic 618, which may also include radio transmit logic and receive logic (not shown); each of which are coupled to control logic 612, which may include V2X logic 614. The transmit logic and/or the receive logic included with the signaling logic and/or the ProSe logic may be the same or similar to the transmit logic and/or the receive logic discussed previously with regard to FIG. 6.

In embodiments, the signaling logic and/or the ProSe logic may be elements or modules of transceiver logic and the like. The electronic device may be coupled with or include one or more plurality of antenna elements of one or more antennas 620. The electronic device and/or the components of the electronic device may be configured to perform operations similar to those described elsewhere in this disclosure. For example, in embodiments where the electronic device is implemented in a UE, the V2X logic may generate a registration request message to be sent to a ProSe Function. The signaling logic may provide the registration request message to the ProSe Function, and the ProSe logic may provide a direct communications session over a DSRC channel when the ProSe Function indicates that the UE is authorized to provide the direct communications session.

As used herein, the term "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. Specifically, the logic may at be at least partially implemented in, or an element of, hardware, software, and/or firmware. In some embodiments, the electronic device logic may be implemented in, or functions associated with the logic may be implemented by, one or more software or firmware modules.

Figure 8:
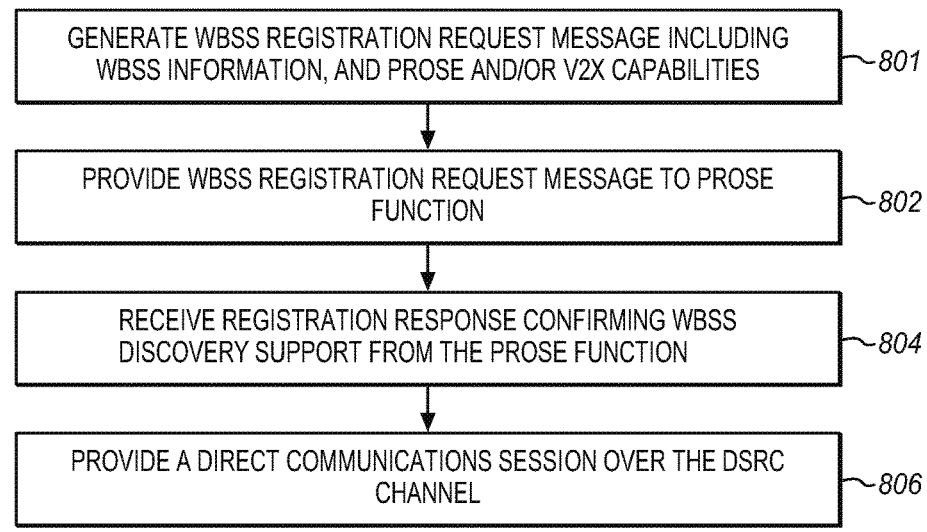
FIG. 8 is a process flow diagram for establishing a direct communications session over DSRC channel messages according to an embodiment.

In some embodiments, the electronic device of FIG. 7 may be configured to perform one or more processes such as the process of FIG. 8. For example, in embodiments where the electronic device is a V2X and/or ProSe enabled UE and/or another like mobile device enabled for V2X ProSe, or is incorporated into or otherwise part of a V2X UE and the like, the process may include the operations shown by FIG. 8.

FIG. 8 is a process flow diagram for establishing a direct communications session over DSRC channel messages according to an embodiment. At 801 the UE may generate a WBSS registration request message to be sent to a proximity services (ProSe) function. In embodiments, the WBSS registration request message may include WBSS information, and ProSe and/or V2X capability indications. At 802 the UE may provide the WBSS registration request message to the ProSe function. The ProSe function may use the WBSS information and/or the capability indications to authorize the UE for WBSS services. At 804 the UE may receive a registration response from the ProSe Function, which may confirm that the UE is authorized to use WBSS services.

The authorization to use the WBSS services may include authorization to provide a direct communications session over a DSRC channel. In various embodiments, the WBSS services may include WBSS discovery support where the UE may discover other V2X enabled UEs or UEs that are to consume or otherwise receive V2X communications, WBSS communications services where the UE may communicate with one or more other V2X enabled UEs, and/or WBSS relay services where the UE may act as a relay node for one or more other V2X enabled UEs to access the core network. At 806 the UE may provide a direct communications session over the DSRC channel when the registration response indicates that the UE is authorized to provide a direct communications session over the DSRC channel.

In some embodiments, the electronic device of FIG. 6 may be configured to perform one or more processes such as the process of FIGS. 8, 9, 10, and 11. For example, in embodiments where the electronic device is implemented in a network element (e.g., an eNB or a CN element) including a ProSe function, the process may include the operations shown by FIGS. 9 and 10. In embodiments where the electronic device is implemented in an MME, the process may include the operations shown by FIG. 11.

Figure 9:
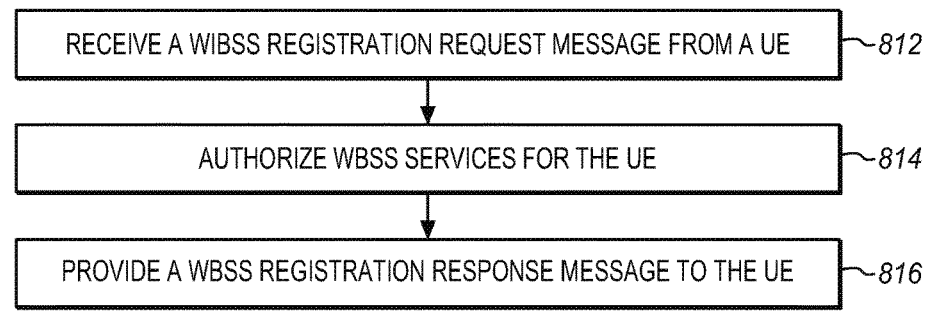
FIG. 9 is a process flow diagram for registering for WBSS according to an embodiment.

FIG. 9 is a process flow diagram for registering for WBSS according to an embodiment. At 812 the network element may receive a WBSS registration request message from a UE. At 814 the network element may authorize registration of one or more WBSS services for the UE. The authorizing of the registration of the WBSS services for the UE may comprise authenticating credentials associated with the UE with a serving network of the UE and/or one or more ITS servers. At 816 the network element may provide a registration response to the UE. The registration response may include an indication as to whether the UE has been authorized for the one or more WBSS services.

Figure 10:
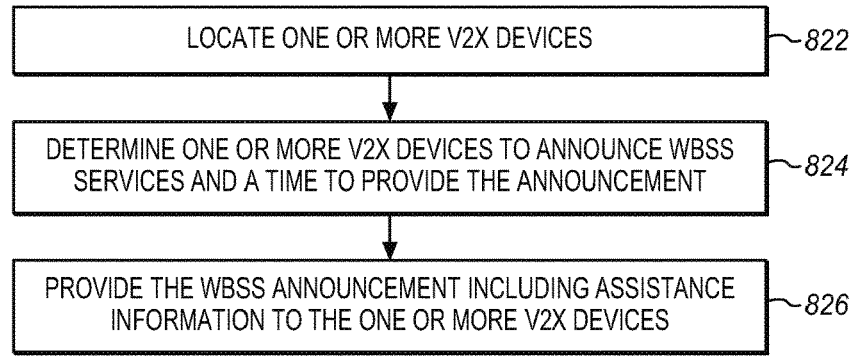
FIG. 10 is a process flow diagram for making WBSS announcements according to an embodiment.

FIG. 10 is a process flow diagram for making WBSS announcements according to an embodiment. At 822 the network element may locate one or more V2X enabled devices (e.g., one or more UEs, etc.). The network element may use location information, subscription information, geo-casting information, and/or other like information for locating the one or more UEs. Once the UEs are located and/or identified, at 824 the network element may determine one or more UEs to announce WBSS services and a time at which to announce the WBSS services. In various embodiments, the network element may use a combination of location, service subscription and geo-casting information to decide where and when to announce WBSS availability.

At 826 the network element may provide the WBSS announcement to the one or more determined UEs by sending a WBSS announcement as shown in FIG. 4. Once a WBSS announcement is received from the network element, the UEs may imitate or otherwise start operation for providing WBSS services using the Assistance Information in the WBSS announcement message. WBSS announcements are transmitted as a broadcast and include the list of services provided by the WBSS, such that the UEs that are subscribed to the service can join the WBSS right away, without sending a response back to the network element, which may reduce various signaling messages and an overall latency in the attachment process. Such reductions may provide device energy efficiencies (e.g., saving battery life, etc.) and/or network resource efficiencies.

Figure 11:
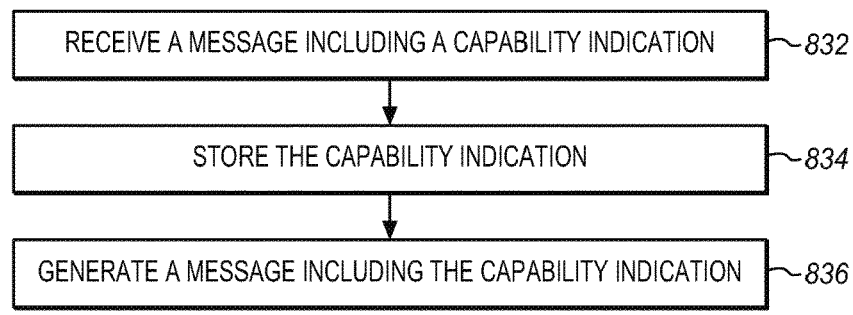
FIG. 11 is a process flow diagram for generating capability messages according to an embodiment.

FIG. 11 is a process flow diagram for generating capability messages according to an embodiment. At 832 the MME may receive a message including a capability indication. At 834 the MME may store the capability indication in one or more computer readable media. At 836 the MME may generate a message that includes the capability information to authorize capabilities indicated by the capability information.

The MME may provide the generated message for authorizing the capabilities indicated by the capability indication. The capability indication may be a ProSe capability indication or a V2X capability indication. The ProSe capability indication may indicate at least one ProSe capability of a user equipment (UE) and the V2X capability indication may indicate at least one V2X capability of the UE. The message may be Attach Request message or a Tracking Area Update Request message, and the capability indication may be included in a UE Network Capability information element (IE) in the Attach Request message and/or the Tracking Area Update Request message.

The message may be a S1-application protocol (AP) Initial Context Setup Request, which includes a ProSe authorized indication or a V2X authorized indication. The ProSe authorized indication may indicate that a user equipment (UE) is authorized to use ProSe and the V2X authorized indication may indicate that the UE is authorized to use WBSS services and/or wireless local area network (WLAN) direct services. The message may be a S1-AP Handover Request message, which may be generated during a S1-based handover procedure.

Figure 12:
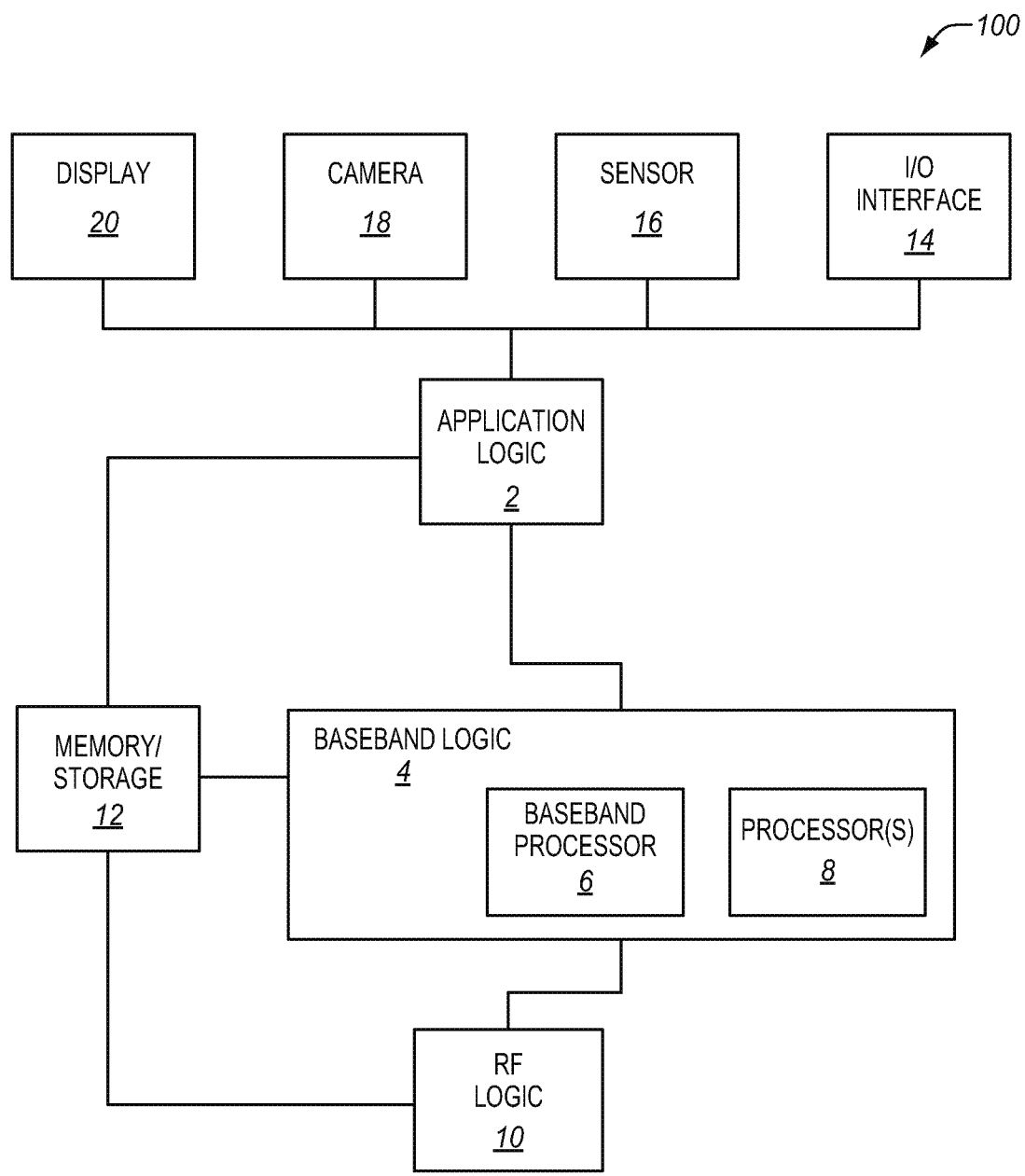
FIG. 12 is a block diagram of an example computing system according to an embodiment.

Embodiments described herein may be implemented into a system using any suitably configured hardware and/or software. FIG. 12 is a block diagram that illustrates, for one embodiment, an example system 100 comprising radio frequency (RF) logic 10, baseband logic 4, application logic 2, memory/storage 12, display 20, camera 18, sensor 16, and input/output (I/O) interface 14, coupled with each other at least as shown.

The application logic 2 may include one or more single-core or multi-core processors. The processor(s) may include any combination of general-purpose processors and dedicated processors (e.g., graphics processors, application processors, etc.). The processors may be coupled with memory/storage and configured to execute instructions stored in the memory/storage to enable various applications and/or operating systems running on the system.

The baseband logic 4 may include one or more single-core or multi-core processors. The processor(s) may include a baseband processor 6 and/or additional or alternative processors 8 that may be designed to implement functions or actions of the control logic, transmit logic, and/or receive logic described elsewhere herein.

The baseband logic may handle various radio control functions that enable communication with one or more radio networks via the RF logic 10. The radio control functions may include, but are not limited to, signal modulation, encoding, decoding, radio frequency shifting, etc. In some embodiments, the baseband logic may provide for communication compatible with one or more radio technologies. For example, in some embodiments, the baseband logic may support communication with an evolved universal terrestrial radio access network (EUTRAN) and/or other wireless metropolitan area networks (WMAN), a wireless local area network (WLAN), a wireless personal area network (WPAN). Embodiments in which the baseband logic is configured to support radio communications of more than one wireless protocol may be referred to as multi-mode baseband logic.

In various embodiments, baseband logic may include logic to operate with signals that are not strictly considered as being in a baseband frequency. For example, in some embodiments, baseband logic may include logic to operate with signals having an intermediate frequency, which is between a baseband frequency and a radio frequency.

RF logic 10 may enable communication with wireless networks using modulated electromagnetic radiation through a non-solid medium. In various embodiments, the RF logic may include switches, filters, amplifiers, etc. to facilitate the communication with the wireless network. In various embodiments, RF logic may include logic to operate with signals that are not strictly considered as being in a radio frequency. For example, in some embodiments, RF logic may include logic to operate with signals having an intermediate frequency, which is between a baseband frequency and a radio frequency.

In various embodiments, transmit logic, control logic, and/or receive logic discussed or described herein may be embodied in whole or in part in one or more of the RF logic 10, the baseband logic 4, and/or the application logic 2. It should be noted that the various logic types disclosed previously may be combined or separated into different logic types and/or referred to as different logic types. For example, in some embodiments, the baseband logic may be combined with the RF logic to operate as signaling logic, communications logic, and the like.

By way of another example, in some embodiments, the baseband logic, the baseband processor, and/or any other like processing device may be referred to a "processing logic," "control logic," and the like. As used herein, the term "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. Specifically, the logic may at be at least partially implemented in, or an element of, hardware, software, and/or firmware. In some embodiments, the electronic device logic may be implemented in, or functions associated with the logic may be implemented by, one or more software or firmware modules.

In some embodiments, some or all of the constituent components of the baseband logic, the application logic, and/or the memory/storage may be implemented together on a system on a chip (SOC).

Memory/storage 12 may be used to load and store data and/or instructions, for example, for system 100. Memory/storage for one embodiment may include any combination of suitable volatile memory (e.g., dynamic random access memory (DRAM)) and/or non-volatile memory (e.g., Flash memory).

In various embodiments, the I/O interface 14 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments sensor 16 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband logic and/or RF logic to communicate with components of a positioning network, e.g., a global positioning system (GPS) satellite.

In various embodiments, the display 20 may include a display (e.g., a liquid crystal display, a touch screen display, etc.).

In various embodiments, the system may be a mobile computing device such as, but not limited to, a laptop computing device, a tablet computing device, a netbook, an ultrabook, a smartphone, etc. In various embodiments, system may have more or less components, and/or different architectures.

In various embodiments, the system may be a mobile computing device such as, but not limited to, a laptop computing device, a tablet computing device, a netbook, an ultrabook, a smartphone, a vehicular communication system or device, an in-vehicle infotainment (IVI) system or device, an in-car entertainment (ICE) system or device, a driver monitoring system or device, a driver attention monitoring device or system, an in-vehicle monitoring system or device, etc. In various embodiments, system may have more or less components, and/or different architectures. For example, in some embodiments the RF logic and/or the baseband logic may be embodied in communication logic (not shown).

The communication logic may include one or more single-core or multi-core processors and logic circuits to provide signal processing techniques, for example, encoding, modulation, filtering, converting, amplifying, etc., suitable to the appropriate communication interface over which communications will take place. The communication logic may communicate over wireline, optical, or wireless communication mediums. In embodiments in which the system is configured for wireless communication, the communication logic may include the RF logic and/or baseband logic to provide for communication compatible with one or more radio technologies. For example, in some embodiments, the communication logic may support communication with an evolved universal terrestrial radio access network (EU-TRAN) and/or other wireless metropolitan area networks (WMAN), a wireless local area network (WLAN), a wireless personal area network (WPAN).

Embodiments of the technology herein may be described as related to the third generation partnership project (3GPP) long term evolution (LTE) or LTE-advanced (LTE-A) standards. For example, terms or entities such as eNodeB (eNB), mobility management entity (MME), user equipment (UE), etc. may be used that may be viewed as LTE-related terms or entities. However, in other embodiments the technology may be used in or related to other wireless technologies such as the Institute of Electrical and Electronic Engineers (IEEE) 802.16 wireless technology (WiMax), IEEE 802.11 wireless technology (Wi-Fi), various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed. In those embodiments, where LTE-related terms such as eNB, MME, UE, etc. are used, one or more entities or components may be used that may be considered to be equivalent or approximately equivalent to one or more of the LTE-based terms or entities.

The detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the various embodiments. However, it will be apparent to those skilled in the art having the benefit of the present disclosure that the various aspects of the embodiments and the claims may be practiced in other examples that depart from these specific details. In certain instances, descriptions of well-known devices, circuits, and methods are omitted so as not to obscure the description of the present embodiments with unnecessary detail.

EXAMPLES

Example 1 may include a system comprising: one or more V2X UEs, one or more V2X ProSe Functions and one or more external servers, wherein at least one of the V2X UEs includes WBSS/DSRC capabilities.

Example 2 may include the system of example 1 and/or any other example disclosed herein, wherein a V2X UE is to send WBSS service registration request to a V2X ProSe Function, wherein the ProSe Function may forward the WBSS service request to other ones of the one or more V2X ProSe Functions and/or the one or more external servers for enabling the V2X UE to use network assistance for WBSS discovery.

Example 3 may include the system of example 1 and/or any other example disclosed herein, wherein the V2X UE offering WBSS services sends a WBSS registration request message, wherein the WBSS registration request message comprises any combination of the following parameters: SSID, operating channel, security information, and service identifiers or a list of PSIDs.

Example 4 may include the system of example 1 and/or any other example disclosed herein, wherein one of the one or more V2X ProSe Functions is a V2X specific functionality that is implemented as part of the ProSe Function.

Example 5 may include the system of example 1 and/or any other example disclosed herein, wherein the V2X ProSe Function is a V2X specific functionality that is implemented as a standalone function.

Example 6 may include the system of example 1 and/or any other example disclosed herein, wherein the V2X ProSe function sends a WBSS registration response to the V2X UE including the WBSS operation parameters that the UE is allowed to use, which include SSID, operating channel.

Example 7 may include the system of example 1 and/or any other example disclosed herein, wherein the V2X ProSe function may use a combination of location, service subscription and geo-casting information to decide where and when to announce WBSS availability by sending a WBSS announcement message containing WBSS assistance information, wherein the WBSS assistance information includes at least one of a SSID and an operating channel.

Example 8 may include the system of example 1 and/or any other example disclosed herein, wherein the V2X UEs that are WBSS/DSRC capable and authorized to use network assistance use the WBSS assistance information in the announcement message to update their configuration to start operation in services indicated by the WBSS announcement message.

Example 9 may include the system of example 1 and/or any other example disclosed herein, wherein the V2X UEs include a WBSS/DSRC capability indication as part of the UE Network Capability Information Element (IE) in an Attach Request message and/or Tracking Area Update Request message.

Example 10 may include the system of example 1 and/or any other example disclosed herein, wherein a mobility management entity (MME) may include a WBSS/DSRC authorized indication in an S1 AP Initial Context Setup Request message, wherein the WBSS/DSRC authorized indication is to indicate whether the UE is capable of supporting WLAN direct services and/or V2X services.

Example 11 may include a user equipment (UE) comprising vehicle to everything (V2X) logic to generate a registration request message to be sent to a proximity services (ProSe) function; signaling logic to provide the registration request message to the ProSe function; and proximity services (ProSe) logic to provide a direct communications session over a dedicated short range communications (DSRC) channel.

Example 12 may include the UE according to the previous example, and/or according to any other examples disclosed herein, wherein the registration request message includes Wireless Access in Vehicular Environments Basic Service Set (WBSS) information, wherein the WBSS information may include at least one of a service set identifier (SSID), security information, and/or a list of service identifiers.

Example 13 may include the UE according to any of the previous examples, and/or according to any other examples disclosed herein, wherein the SSID is a basic service set identifier (BSSID) by IEEE 802.11p.

Example 14 may include the UE according to any of the previous examples, and/or according to any other examples disclosed herein, wherein the security information includes V2X UE authentication information. The authentication information may be authentication information as defined by the IEEE 1609.2 standard.

Example 15 may include the UE according to any of the previous examples, and/or according to any other examples disclosed herein, wherein the list of service identifiers includes at least one of a Provider Service Identifier (PSID), wherein the PSID uniquely defines application-services provided by a higher layer entity.

Example 16 may include the UE according to any of the previous examples, and/or according to any other examples disclosed herein, wherein the signaling logic is to provide the registration request message to the ProSe function over a first interface.

Example 17 may include the UE according to any of the previous examples, and/or according to any other examples disclosed herein, wherein the ProSe function communicates with a ProSe application server over a second interface.

Example 18 may include the UE according to any of the previous examples, and/or according to any other examples disclosed herein, wherein the first interface is a PC3 interface and the second interface is a PC2 interface.

Example 19 may include the UE according to any of the previous examples, and/or according to any other examples disclosed herein, wherein the signaling logic is to receive a registration response from the ProSe function, wherein the registration response includes an indication as to whether the UE has been authorized for Wireless Access in Vehicular Environments Basic Service Set (WBSS) services.

Example 20 may include the UE according to any of the previous examples, and/or according to any other examples disclosed herein, wherein the registration response includes WBSS Information to be used by the UE for the WBSS services.

Example 21 may include the UE according to any of the previous examples, and/or according to any other examples disclosed herein, wherein the control logic is to use the WBSS information in the registration response to change the WBSS configuration parameters, wherein the WBSS configuration parameters include at least one of one or more security keys or an operating channel for the direct communications session.

Example 22 may include the UE according to any of the previous examples, and/or according to any other examples disclosed herein, wherein the registration request message includes a capability indication, wherein the capability indication is to indicate ProSe capabilities of the UE and/or V2X capabilities of the UE.

Example 23 may include the UE according to any of the previous examples, and/or according to any other examples disclosed herein, wherein the V2X logic is to generate another message when the UE acquires a new ProSe capability and/or when the UE acquires a new V2X capability, and the signaling logic is to provide the other message to the ProSe function in response to the generation of the other message.

Example 24 may include the UE according to any of the previous examples, and/or according to any other examples disclosed herein, wherein the control logic is to include the capability indication is included in a UE Network Capability Information Element (IE) in non-access stratum (NAS) message. The NAS message may be an Attach Request message and/or a Tracking Area Update Request message.

Example 25 may include the UE according to any of the previous examples, and/or according to any other examples disclosed herein, wherein the registration request message is to include a list of subscribed WBSS services, wherein the list of subscribed WBSS services is a Provider Service Identifier (PSID) list.

Example 26 may include the UE according to any of the previous examples, and/or according to any other examples disclosed herein, wherein the signaling logic is to receive a WBSS announcement from the ProSe Function, wherein the WBSS announcement includes assistance information, and the control logic is to use the assistance information to initiate WBSS services indicated by the WBSS announcement.

Example 27 may include the UE according to any of the previous examples, and/or according to any other examples disclosed herein, wherein the assistance information is to allow the UE to join the WBSS services indicated by the WBSS announcement without requiring the UE to send a response message or an acknowledgement message back to the ProSe Function.

Example 28 may include the UE according to any of the previous examples, and/or according to any other examples disclosed herein, wherein the ProSe function resides in an evolved Node B (eNB), and the signaling logic is to provide the registration request message to the ProSe function over a LTE-Uu interface.

Example 29 may include the UE according to any of the previous examples, and/or according to any other examples disclosed herein, wherein the ProSe function resides in a core network (CN) element that is communicatively coupled via a third interface with a serving gateway (SGW) or a packet data network (PDN) gateway (PGW).

Example 30 may include a computer-implemented method comprising generating, by a user equipment (UE), a registration request message to be sent to a proximity services (ProSe) function; providing, by the UE, the registration request message to the ProSe function; receiving, by the UE, a registration response from the ProSe function; and providing, by the UE, a direct communications session over a dedicated short range communications (DSRC) channel when the registration response indicates that the UE is authorized to provide a direct communications session over the DSRC channel.

Example 31 may include the method according to the previous example, and/or according to any other examples disclosed herein, wherein the registration request message includes Wireless Access in Vehicular Environments Basic Service Set (WBSS) information, wherein the WBSS information may include at least one of a service set identifier (SSID), security information, and/or a list of service identifiers.

Example 32 may include the method according to any of the previous examples, and/or according to any other examples disclosed herein, wherein the SSID is a basic service set identifier (BSSID) by IEEE 802.11p.

Example 33 may include the method according to any of the previous examples, and/or according to any other examples disclosed herein, wherein the security information includes V2X UE authentication information. The authentication information may be authentication information as defined by the IEEE 1609.2 standard.

Example 34 may include the method according to any of the previous examples, and/or according to any other examples disclosed herein, wherein the list of service identifiers includes at least one of a Provider Service Identifier (PSID), wherein the PSID uniquely defines application-services provided by a higher layer entity.

Example 35 may include the method according to any of the previous examples, and/or according to any other examples disclosed herein, further comprising providing the registration request message to the ProSe function over a first interface.

Example 36 may include the method according to any of the previous examples, and/or according to any other examples disclosed herein, wherein the ProSe function communicates with a ProSe application server over a second interface.

Example 37 may include the method according to any of the previous examples, and/or according to any other examples disclosed herein, wherein the first interface is a PC3 interface and the second interface is a PC2 interface.

Example 37 may include the method according to any of the previous examples, and/or according to any other examples disclosed herein, further comprising receiving a registration response from the ProSe function, wherein the registration response includes an indication as to whether the UE has been authorized for Wireless Access in Vehicular Environments Basic Service Set (WBSS) services.

Example 38 may include the method according to any of the previous examples, and/or according to any other examples disclosed herein, wherein the registration response includes WBSS Information to be used by the method for the WBSS services.

Example 39 may include the method according to any of the previous examples, and/or according to any other examples disclosed herein, further comprising, extracting the WBSS information from the registration response; and changing at least one WBSS configuration parameter of a plurality of WBSS configuration parameters, wherein the WBSS configuration parameters include at least one of one or more security keys or an operating channel for the direct communications session.

Example 40 may include the method according to any of the previous examples, and/or according to any other examples disclosed herein, wherein the registration request message includes a capability indication, wherein the capability indication is to indicate ProSe capabilities of the UE and/or V2X capabilities of the UE.

Example 41 may include the method according to any of the previous examples, and/or according to any other examples disclosed herein, further comprising, acquiring, by the UE, at least one of a new a new ProSe capability and/or a new V2X capability; generating another message when the UE acquires the new ProSe capability and/or when the UE acquires the new V2X capability; and providing the other message to the ProSe function in response to the generating the other message.

Example 42 may include the method according to any of the previous examples, and/or according to any other examples disclosed herein, further comprising, placing the capability indication in a UE Network Capability Information Element (IE) in non-access stratum (NAS) message. The NAS message may be an Attach Request message and/or a Tracking Area Update Request message.

Example 43 may include the method according to any of the previous examples, and/or according to any other examples disclosed herein, wherein the registration request message includes a list of subscribed WBSS services, wherein the list of subscribed WBSS services is a Provider Service Identifier (PSID) list.

Example 44 may include the method according to any of the previous examples, and/or according to any other examples disclosed herein, further comprising, receiving a WBSS announcement from the ProSe Function, wherein the WBSS announcement includes assistance information; extracting the assistance information from the WBSS announcement; and initiating one or more WBSS services indicated by the WBSS announcement using the assistance information.

Example 45 may include the method according to any of the previous examples, and/or according to any other examples disclosed herein, further comprising: joining a communications session using the assistance information indicated by the WBSS announcement without providing a response message and/or an acknowledgement message to the ProSe Function.

Example 46 may include the method according to any of the previous examples, and/or according to any other examples disclosed herein, wherein the ProSe function resides in an evolved Node B (eNB), and the method further comprises: providing the registration request message to the ProSe function over a LTE-Uu interface.

Example 47 may include the method according to any of the previous examples, and/or according to any other examples disclosed herein, wherein the ProSe function resides in a core network (CN) element that is communicatively coupled via a third interface with a serving gateway (SGW) or a packet data network (PDN) gateway (PGW).

Example 48 may include one or more non-transitory computer-readable media comprising instructions to cause an electronic device, upon execution of the instructions by one or more processors of the electronic device, to perform one or more elements of a method described in or related to any of examples 1-47, or any other method or process described herein.

Example 49 may include the a network element comprising control logic to authorize registration of a Wireless Access in Vehicular Environments Basic Service Set (WBSS) service for a user equipment (UE), wherein to authorize registration of the WBSS for the UE, the control logic is to authenticate credentials associated with the UE with a serving network of the UE and/or one or more external intelligent transportation systems (ITS) servers; and signaling logic to provide a registration response to the UE wherein the registration response includes an indication as to whether the UE has been authorized for the WBSS services.

Example 50 may include the network element according to any of the previous examples, and/or according to any other examples disclosed herein, wherein the signaling logic is to receive a registration request message from a UE, wherein the registration request message is to request authorization to use the WBSS services, and the control logic is to authorize registration of the WBSS for the UE in response to the reception of the registration request message.

Example 51 may include the network element according to any of the previous examples, and/or according to any other examples disclosed herein, wherein the registration request message includes a capability indication, wherein the capability indication is to indicate ProSe capabilities of the UE and/or V2X capabilities of the UE.

Example 52 may include the network element according to any of the previous examples, and/or according to any other examples disclosed herein, wherein the registration response includes WBSS Information to be used by the UE for the WBSS services.

Example 53 may include the network element according to any of the previous examples, and/or according to any other examples disclosed herein, wherein the UE is to use the WBSS information in the registration response to change the WBSS configuration parameters, wherein the WBSS configuration parameters include at least one of one or more security keys or an operating channel for the direct communications session.

Example 54 may include the network element according to any of the previous examples, and/or according to any other examples disclosed herein, wherein the control logic is to identify one or more UEs capable of providing V2X capabilities and one or more other UEs within a wireless communications service area provided by an evolved Node B (eNB).

Example 55 may include the network element according to any of the previous examples, and/or according to any other examples disclosed herein, wherein the control logic is to generate a WBSS announce message wherein the WBSS announce message is to indicate an availability of the WBSS services and a list of services provided by the WBSS services.

Example 56 may include the network element according to any of the previous examples, and/or according to any other examples disclosed herein, wherein the control logic is to determine one or more UEs to provide with the WBSS announce message and determine a time during which to provide the WBSS announce message to the one or more UEs, wherein to determine the one or more UEs, the control logic is to use location information for each of the one or more UEs, service subscription information for each of the one or more UEs, and/or geo-casting information for each of the one or more UEs.

Example 57 may include the network element according to any of the previous examples, and/or according to any other examples disclosed herein, wherein the WBSS announcement message includes the assistance information, and wherein each of the one or more UEs are to use the assistance information to initiate the WBSS services indicated as available by the WBSS announcement message.

Example 58 may include the network element according to any of the previous examples, and/or according to any other examples disclosed herein, wherein the control logic and the signaling logic are integrated within a proximity services (ProSe) Function included with the network element.

Example 59 may include the network element according to any of the previous examples, and/or according to any other examples disclosed herein, wherein the network element is an evolved Node B (eNB) that includes the ProSe function, and the signaling logic is to receive the registration request message from the UE over a LTE-Uu interface.

Example 60 may include the network element according to any of the previous examples, and/or according to any other examples disclosed herein, wherein when the network element is an eNB, the control logic is to include a ProSe authorised indication or a V2X authorized indication in an X2-application protocol (AP) Handover Request message during X2-based handover procedure, wherein the ProSe authorized indication is to indicate that the UE is authorized to use ProSe and the V2X authorized indication is to indicate that the UE is authorized to use WBSS services and/or wireless local area network (WLAN) direct services.

Example 61 may include the network element according to any of the previous examples, and/or according to any other examples disclosed herein, wherein the network element is a core network (CN) element that includes the ProSe function, and the CN element is communicatively coupled via an interface with a serving gateway (SGW) or a packet data network (PDN) gateway (PGW).

Example 62 may include a computer-implemented method comprising, authorizing, by a network element, registration of a Wireless Access in Vehicular Environments Basic Service Set (WBSS) service for a user equipment (UE), wherein to authorizing registration of the WBSS service for the UE comprises authenticating credentials associated with the UE with a serving network of the UE and/or one or more external intelligent transportation systems (ITS) servers; and providing a registration response to the UE wherein the registration response includes an indication as to whether the UE has been authorized for the WBSS services.

Example 63 may include the method according to any of the previous examples, and/or according to any other examples disclosed herein, further comprising, receiving a registration request message from a UE, wherein the registration request message is to request authorization to use the WBSS services; and authorizing the registration of the WBSS for the UE in response to the reception of the registration request message.

Example 64 may include the method according to any of the previous examples, and/or according to any other examples disclosed herein, wherein the registration request message includes a capability indication, wherein the capability indication is to indicate ProSe capabilities of the UE and/or V2X capabilities of the UE.

Example 65 may include the method according to any of the previous examples, and/or according to any other examples disclosed herein, wherein the registration response includes WBSS Information to be used by the UE for the WBSS services.

Example 66 may include the method according to any of the previous examples, and/or according to any other examples disclosed herein, wherein the WBSS information in the registration response is to be used by the UE to change one or more WBSS configuration parameters, wherein the WBSS configuration parameters include at least one of one or more security keys or an operating channel for the direct communications session.

Example 67 may include the method according to any of the previous examples, and/or according to any other examples disclosed herein, further comprising, identifying one or more UEs capable of providing V2X capabilities and one or more other UEs within a wireless communications service area provided by an evolved Node B (eNB).

Example 68 may include the method according to any of the previous examples, and/or according to any other examples disclosed herein, further comprising, generating a WBSS announce message wherein the WBSS announce message is to indicate an availability of the WBSS services and a list of services provided by the WBSS services.

Example 69 may include the method according to any of the previous examples, and/or according to any other examples disclosed herein, further comprising, determining one or more UEs to provide with the WBSS announce message; determining a time during which to provide the WBSS announce message to the one or more determined UEs, wherein determining the one or more UEs comprises, obtaining location information for each of the one or more UEs, obtaining service subscription information for each of the one or more UEs, and/or obtaining geo-casting information for each of the one or more UEs; and determining to provide the WBSS announce message to the one or more UEs that are within a desired position relative to the eNB.

Example 70 may include the method according to any of the previous examples, and/or according to any other examples disclosed herein, wherein the WBSS announcement message includes the assistance information, and wherein each of the one or more UEs are to use the assistance information to initiate the WBSS services indicated as available by the WBSS announcement message.

Example 71 may include the method according to any of the previous examples, and/or according to any other examples disclosed herein, wherein the network element is an evolved Node B (eNB) that includes a ProSe function, and the receiving the registration request message from the UE is done over a LTE-Uu interface.

Example 72 may include the method according to any of the previous examples, and/or according to any other examples disclosed herein, wherein when the network element is an eNB, the method further comprises: including a ProSe authorised indication or a V2X authorized indication in an X2-application protocol (AP) Handover Request message during X2-based handover procedure, wherein the ProSe authorized indication is to indicate that the UE is authorized to use ProSe and the V2X authorized indication is to indicate that the UE is authorized to use WBSS services and/or wireless local area network (WLAN) direct services.

Example 73 may include the method according to any of the previous examples, and/or according to any other examples disclosed herein, wherein the network element is a core network (CN) element includes the ProSe function, and the CN element is communicatively coupled via an interface with a serving gateway (SGW) or a packet data network (PDN) gateway (PGW).

Example 74 may include one or more non-transitory computer-readable media comprising instructions to cause an electronic device, upon execution of the instructions by one or more processors of the electronic device, to perform one or more elements of a method described in or related to any of examples 49-73, or any other method or process described herein.

Example 75 may include a computer-implemented method comprising, identifying, by a network element, one or more UEs capable of providing V2X capabilities and one or more other UEs within a wireless communications service area provided by an evolved Node B (eNB); and providing, by the network element, a Wireless Access in Vehicular Environments Basic Service Set (WBSS) announce message to the identified one or more UEs, wherein the WBSS announce message indicates one or more WBSS services that the identified one or more UEs may utilize.

Example 76 may include the method according to any of the previous examples, and/or according to any other examples disclosed herein, further comprising, generating the WBSS announce message wherein the WBSS announce message is to indicate an availability of the WBSS services and a list of services provided by the WBSS services.

Example 77 may include the method according to any of the previous examples, and/or according to any other examples disclosed herein, wherein the identifying comprises, determining the one or more UEs to provide with the WBSS announce message; determining a time during which to provide the WBSS announce message to the one or more determined UEs, wherein determining the one or more UEs comprises, obtaining location information for each of the one or more UEs, obtaining service subscription information for each of the one or more UEs, and/or obtaining geocasting information for each of the one or more UEs; and determining to provide the WBSS announce message to the one or more UEs that are within a desired position relative to the eNB.

Example 78 may include the method according to any of the previous examples, and/or according to any other examples disclosed herein, wherein the WBSS announce message includes assistance information, and wherein each of the one or more UEs are to use the assistance information to initiate one or more of the WBSS services indicated as available by the WBSS announce message.

Example 79 may include the method according to any of the previous examples, and/or according to any other examples disclosed herein, wherein the network element is an evolved Node B (eNB) that includes a ProSe function, and the providing the announce message is done over a LTE-Uu interface.

Example 80 may include the method according to any of the previous examples, and/or according to any other examples disclosed herein, wherein when the network element is an eNB, the method further comprises: including a ProSe authorised indication or a V2X authorized indication in an X2-application protocol (AP) Handover Request message during X2-based handover procedure, wherein the ProSe authorized indication is to indicate that the UE is authorized to use ProSe and the V2X authorized indication is to indicate that the UE is authorized to use WBSS services and/or wireless local area network (WLAN) direct services.

Example 81 may include the method according to any of the previous examples, and/or according to any other examples disclosed herein, wherein the network element is a core network (CN) element includes the ProSe function, and the CN element is communicatively coupled via an interface with a serving gateway (SGW) or a packet data network (PDN) gateway (PGW).

Example 82 may include one or more non-transitory computer-readable media comprising instructions to cause an electronic device, upon execution of the instructions by one or more processors of the electronic device, to perform one or more elements of a method described in or related to any of examples 75-81, or any other method or process described herein.

Example 83 may include a mobility management entity (MME) comprising signaling logic to receive a message including a capability indication; and control logic to store the capability indication, and provide the capability information to authorize capabilities indicated by the capability information.

Example 84 may include the MME according to any of the previous examples, and/or according to any other examples disclosed herein, wherein the capability indication is a Proximity Services (ProSe) capability indication or a vehicle to everything (V2X) capability indication, wherein the ProSe capability indication is to indicate at least one ProSe capability of a user equipment (UE) and the V2X capability indication is to indicate at least one V2X capability of the UE.

Example 85 may include the MME of the previous example, and/or any other example disclosed herein, wherein the message is an Attach Request message or a Tracking Area Update Request message and the capability indication is included in a UE Network Capability information element (IE) in the Attach Request message and/or the Tracking Area Update Request message.

Example 86 may include the MME of the previous example, and/or any other example disclosed herein, wherein the control logic is to generate another message including a ProSe authorized indication or a V2X authorized indication, wherein the ProSe authorized indication is to indicate that a user equipment (UE) is authorized to use ProSe and the V2X authorized indication is to indicate that the UE is authorized to use WBSS services and/or wireless local area network (WLAN) direct services.

Example 87 may include the MME of the previous example, and/or any other example disclosed herein, wherein the other message is a S1-application protocol (AP) Initial Context Setup Request.

Example 88 may include the MME of the previous example, and/or any other example disclosed herein, wherein the control logic is to include the ProSe authorised indication or the V2X authorized indication in a S1-AP Handover Request message during a S1-based handover procedure.

Example 89 may include a computer implemented method comprising, receiving, by a mobility management entity (MME), a message including a capability indication; storing, by the MME, the capability indication in one or more computer readable media; and providing, by the MME, the capability information to authorize capabilities indicated by the capability information.

Example 90 may include the method according to any of the previous examples, and/or according to any other examples disclosed herein, wherein the capability indication is a Proximity Services (ProSe) capability indication or a vehicle to everything (V2X) capability indication, wherein the ProSe capability indication is to indicate at least one ProSe capability of a user equipment (UE) and the V2X capability indication is to indicate at least one V2X capability of the UE.

Example 91 may include the method of the previous example, and/or any other example disclosed herein, wherein the message is an Attach Request message or a Tracking Area Update Request message and the capability indication is included in a UE Network Capability information element (IE) in the Attach Request message and/or the Tracking Area Update Request message.

Example 92 may include the method of the previous example, and/or any other example disclosed herein, further comprising, generating another message including a ProSe authorized indication or a V2X authorized indication, wherein the ProSe authorized indication is to indicate that a user equipment (UE) is authorized to use ProSe and the V2X authorized indication is to indicate that the UE is authorized to use WBSS services and/or wireless local area network (WLAN) direct services.

Example 93 may include the method of the previous example, and/or any other example disclosed herein, wherein the other message is a S1-application protocol (AP) Initial Context Setup Request.

Example 94 may include the method of the previous example, and/or any other example disclosed herein, further comprising generating another message including the ProSe authorised indication or the V2X authorized indication, wherein the other message is a S1-AP Handover Request message, and wherein the generating the other message is during a S1-based handover procedure.

Example 95 may include one or more non-transitory computer-readable media comprising instructions to cause an electronic device, upon execution of the instructions by one or more processors of the electronic device, to perform one or more elements of a method described in or related to any of examples 89-94, or any other method or process described herein.

Example 96 may include an apparatus comprising means to perform one or more elements of a method described in or related to any of examples 1-94, or any other method or process described herein.

Example 97 may include an apparatus comprising control logic, transmit logic, and/or receive logic to perform one or more elements of a method described in or related to any of examples 1-51, or any other method or process described herein.

Example 98 may include a method of communicating in a wireless network as shown and described herein.

Example 99 may include a system for providing wireless communication as shown and described herein.

Example 100 may include a device for providing wireless communication as shown and described herein.

The foregoing description of one or more implementations provides illustration and description, but is not intended to be exhaustive or to limit the scope of the claims to the precise form disclosed. Modifications and variations are possible in light of the above teachings or may be acquired from practice of various implementations of the described embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a machine-readable medium having instructions thereon that when operated on by the machine cause the machine to perform operations that include receiving a registration request from a user equipment (UE) in a vehicular environment to provide services over a wireless access in vehicular environments (WAVE) basic service set (WBSS) in wireless channels at a vehicular proximity services (ProSe) function, deciding at the ProSe function to authorize registration of the UE to provide services over the WBSS, and sending a registration response from the ProSe function confirming WBSS information to be used for the services after deciding to authorize the UE.

In further embodiments the wireless channels are dedicated short range communications channels.

In further embodiments the wireless channels are 802.11p channels.

In further embodiments the registration request includes WBSS information including configuration parameters from the UE.

In further embodiments the WBSS information corresponds to a WBSS from which the UE wishes to obtain announcements.

In further embodiments the WBSS information corresponds to a WBSS within which the UE wishes to transmit messages In further embodiments the messages comprise basic safety messages (BSM).

In further embodiments sending a registration response comprises sending WBSS information from the ProSe function to change WBSS configuration parameters from parameters of the registration request.

In further embodiments the WBSS information include one or more of: a basic service set identifier (BSSID), a DSRC channel number, for example a control channel (CCH) or a service channel (SCH), UE authentication information, and one or more service ids, such as a Provider Service Identifier (PSID) which uniquely defines application services provided by a higher layer entity.

In further embodiments deciding to authorize comprises authenticating the UE's credentials with an intelligent transportation system (ITS) server.

In further embodiments receiving the registration request comprises receiving the registration request at an evolved node B (eNB) and wherein deciding comprises confirming authorization of the UE at a ProSe function in a core network (CN).

In further embodiments receiving the registration request comprises receiving the registration request in an Attach Request or Tracking Area Update Request message.

Some embodiments pertain to processing circuitry of a user equipment (UE) in a vehicular environment, where the processing circuitry is to receive an announcement of availability of a wireless access in vehicular environments (WAVE) basic service set (WBSS) at the UE from a vehicular environment proximity services (ProSe) Function, the announcement including a list of services provided by the announced WBSS, to determine at the UE whether the UE is subscribed to a listed service of the announced WBSS, and to start operation by the UE in the announced WBSS if the UE is subscribed by joining the WBSS without sending a response to the ProSe Function.

In further embodiments the announcement is received as one of a broadcast, a multicast, or a unicast.

In further embodiments the circuitry is to start operation by receiving basic safety messages (BSM) over a wireless local area network (WLAN).

Further embodiments pertain to the UE also including the processing circuitry baseband logic to provide communication with an enhanced node B to receive the announcement.

Embodiments further include a memory to store a list of services and application logic wherein the application logic determines whether the UE is subscribed to a listed service.

Embodiments further include RF logic to receive BSM through an antenna for processing.

Some embodiments pertain to an apparatus that includes means for receiving a message including a Proximity Services (ProSe) capability indication to indicate at least one ProSe capability of a user equipment (UE) in a vehicular environment, means for storing the capability indication, means for providing the capability information to a ProSe functionality to authorize capabilities indicated by the capability information, and means for generating a message to the UE including a ProSe authorized indication to indicate that the UE is authorized to use ProSe to communicate with other UEs in the vehicular environment.

In further embodiments the received message is an Attach Request message and the capability indication is included in a UE Network Capability information element (IE) in the Attach Request message.

In further embodiments the received message is a Tracking Area Update Request message and the capability indication is included in a UE Network Capability information element (IE) in the Tracking Area Update Request message.

In further embodiments the means for receiving, means for storing and means for generating are comprised of an evolved node B eNB and wherein the means for providing provides the capability information to a ProSe functionality of a packet data network gateway (PGW).

The invention claimed is:

1. One or more non-transitory computer-readable media comprising instructions to cause an electronic device, upon execution of the instructions by one or more processors of the electronic device, to perform operations including:

receiving, at a vehicular proximity services (ProSe) Function and from a User Equipment (UE), a registration request for the UE to communicate over wireless channels as part of a Wireless Access in Vehicular Environments (WAVE) basic service set (BSS) (WBSS), the registration request including WBSS information and a UE capability indication, the WBSS information including BSS identifier (BSSID), and a Dedicated Short Range Communications (DSRC) channel number, the UE capability indication to indicate at least one of proximity services (ProSe) capabilities of the UE or vehicle to everything (V2X) capabilities of the UE;

in response to, and after receiving the registration request, deciding, at the ProSe Function and based on the WBSS information and the UE capability indication, whether to authorize the registration request; and sending, from the ProSe Function and after deciding whether to authorize the registration request, a registration response to the UE indicating whether the UE has been authorized to communicate as part of the WBSS, wherein, where the registration request has been authorized by the ProSe Function:

the registration response includes WBSS information to be used by the UE in communicating as part of the WBSS; and the operations further include:

determining one or more UEs, and a time at which to announce availability of the WBSS, based on location information of the one or more UEs and based on service subscription information of the one or more UEs, the one or more UEs including the UE;

deciding, at the ProSe Function, to send from the ProSe Function to the one or more UEs, an announcement of availability of wireless access in the WBSS, the announcement including a list of subscribed services provided by the WBSS; and sending the announcement of availability to the one or more UEs.

2. The computer-readable media of claim 1, wherein the wireless channels include DSRC channels or channels compliant with Institute of Electrical and Electronics Engineers (IEEE) 802.11 (p) standard.

3. The computer-readable media of claim 1, wherein the WBSS information in the registration response one of corresponds to the WBSS information in the registration request, or represents other WBSS information that the UE wishes to use to communicate basic safety messages.

4. The computer-readable media of claim 1, wherein the registration request is further for the UE to provide services over the WBSS.

5. The computer-readable media of claim 1, wherein the WBSS information in the registration request corresponds a WBSS from which the UE wish to obtain announcements or to a WBSS within which the UE wishes to transmit basic safety messages.

6. The computer-readable media of claim 1, wherein the WBSS information in any of the registration request or the registration response includes at least one of one or more security, one or more operating channels for communication of basic safety messages, or one or more service identifiers.

7. The computer-readable media of claim 1, further including authenticating, by the ProSe Function, credentials of the UE with an Intelligent Transportation System (ITS).

8. The computer-readable media of claim 1, wherein the ProSe Function is hosted in a core network of a cellular network.

9. The computer-readable media of claim 1, wherein the announcement of availability is one of broadcast, multicast or unicast.

10. An apparatus including:
a memory; and
one or more processors coupled to the memory, the one or more processors to:
- receive, from a User Equipment (UE), a registration request for the UE to communicate over wireless channels as part of a Wireless Access in Vehicular Environments (WAVE) basic service set (BSS) (WBSS), the registration request including WBSS information and a UE capability indication, the WBSS information including BSS identifier (BSSID), and a Dedicated Short Range Communications (DSRC) channel number, the UE capability indication to indicate at least one of proximity services (ProSe) capabilities of the UE or vehicle to everything (V2X) capabilities of the UE;
- in response to, and after receiving the registration request, decide, based on the WBSS information and the UE capability indication, whether to authorize the registration request; and
- send, after deciding whether to authorize the registration request, a registration response to the UE indicating whether the UE has been authorized to communicate as part of the WBSS, wherein, where the registration request has been authorized:
   the registration response includes WBSS information to be used by the UE in communicating as part of the WBSS; and
   the one or more processors are to further:
      determine one or more UEs, and a time at which to announce availability of the WBSS, based on location information of the one or more UEs and based on service subscription information of the one or more UEs, the one or more UEs including the UE;
      decide to send to the one or more UEs, an announcement of availability of wireless access in the WBSS, the announcement including a list of subscribed services provided by the WBSS; and
      send the announcement of availability to the one or more UEs.

11. The apparatus of claim 10, wherein the wireless channels include DSRC channels or channels compliant with Institute of Electrical and Electronics Engineers (IEEE) 802.11 (p) standard.

12. The apparatus of claim 10, wherein the WBSS information in the registration response one of corresponds to the WBSS information in the registration request, or represents other WBSS information that the UE wishes to use to communicate basic safety messages.

13. The apparatus of claim 10, wherein the registration request is further for the UE to provide services over the WBSS.

14. The apparatus of claim 10, wherein the WBSS information in the registration request corresponds a WBSS from which the UE wish to obtain announcements or to a WBSS within which the UE wishes to transmit basic safety messages.

15. The apparatus of claim 10, wherein the WBSS information in any of the registration request or the registration response includes at least one of one or more security keys, one or more operating channels for communication of basic safety messages, or one or more service identifiers.

16. The apparatus of claim 10, the one or more processor to further authenticate credentials of the UE with an Intelligent Transportation System (ITS).

17. The apparatus of claim 10, wherein the announcement of availability is one of broadcast, multicast or unicast.

18. An apparatus including:
a memory; and
one or more processors coupled to the memory, the one or more processors to:
- based on Wireless Access in Vehicular Environments (WAVE) basic service set (BSS) (WBSS) information and User Equipment (UE) capability indication in individual ones of a plurality of registration requests from respective ones of a plurality of User Equipments (UEs), determine whether to authorize the registration requests, wherein each registration request is for a corresponding UE to communicate over wireless channels as part of a WBSS, the WBSS information including BSS identifier (BSSID), and a Dedicated Short Range Communications (DSRC) channel number, the UE capability indication to indicate at least one of proximity services (ProSe) capabilities of the corresponding UE or vehicle to everything (V2X) capabilities of the corresponding UE; and
- cause transmission, after deciding whether to authorize the registration requests, of respective registration responses to corresponding ones of the plurality of UEs, individual ones of the registration responses indicating whether a UE has been authorized to communicate as part of the WBSS, wherein, where some of the registration requests have been authorized for some of the UEs:
   individual ones of registration responses corresponding to respective ones of said some of the registration requests include WBSS information to be used by a corresponding one of said some of the UEs in communicating as part of the WBSS; and
   the one or more processors are to further:
      determine one or more UEs of said some of the UEs, and a time at which to announce availability of the WBSS, based on location information of the one or more UEs, and based on service subscription information of the one or more UEs;
      decide to cause transmission to the one or more UEs, of an announcement of availability of wireless access in the WBSS, the announcement including a list of subscribed services provided by the WBSS; and
      cause transmission of the announcement of availability to the one or more UEs.

19. The apparatus of claim 18, wherein the one or more processors are further to receive the plurality of registration requests, to send the respective registration responses, and to send the announcement of availability.

* * * * *